United States Patent Office 2,989,509
Patented June 20, 1961

2,989,509
TRIOXANE POLYMER STABILIZATION
Donald E. Hudgin, Summit, and Frank M. Berardinelli, South Orange, N.J., assignors to Celanese Corporation of America, New York, N.Y., a corporation of Delaware
No Drawing. Filed Feb. 28, 1958, Ser. No. 718,147
14 Claims. (Cl. 260—67)

This invention relates to solid, resinous polyoxymethylenes derived from the catalytic polymerization of trioxane and particularly to the stabilization of such polymers against degradation during purification. This application is a continuation-in-part of our application Serial No. 691,143, filed October 21, 1957.

It is known that trioxane may be polymerized to a high molecular weight polyoxymethylene containing recurring —CH$_2$O— groups, which is useful in the preparation of molded articles of exceptional toughness. The polymerization process is generally carried out in the presence of a small amount of an acidic catalyst such as the acidic coordinate complexes of boron trifluoride, certain specific metallic fluorides and chlorides and certain specific derivatives of sulfonic acid.

The preferred catalysts are boron fluoride coordinate complexes with organic compounds in which oxygen or sulfur is the donor atom and boron fluoride coordinate complexes with water. Complete descriptions of catalytic processes making use of the boron fluoride complexes with the aforesaid organic compounds may be found in our aforementioned application Serial No. 691,143. The boron fluoride coordinate complexes with water are boron fluoride monohydrate, boron fluoride dihydrate and boron fluoride trihydrate. Polymerization conditions with the boron fluoride coordinate complexes with water are identical with those described in application Serial No. 691,143 for the boron fluoride coordinate complexes with the aforesaid organic compounds.

In such polymerization reactions, a reaction product is obtained which generally contains substantial amounts of polyoxymethylene and unreacted trioxane and minor amounts of acidic catalyst. It is necessary to remove the unreacted trioxane from the product and preferably to recover it or recycle it for further polymerization. It has now been found that substantial degradation of the polymer takes place during the removal of unreacted trioxane from the reaction mixture unless particular precautions are taken.

It has been found that contact of solid, resinous polyoxymethylene with acid catalysts in the absence of substantial quantities of trioxane results in degradation of the polymer.

It is an object of this invention to provide a method for removing unreacted trioxane from a reaction mixture of trioxane, solid, resinous polyoxymethylene and acidic polymerization catalyst without substantial degradation of the polyoxymethylene. Other objects will appear hereinafter.

The objects of this invention are achieved by a process which comprises treating a mixture of trioxane, solid, resinous polyoxymethylene and acidic trioxane-polymerization catalyst with a catalyst neutralization agent and thereafter removing said trioxane from said mixture.

While it is not desired to be bound by any particular theory of operation, it is believed that the acidic trioxane-polymerization catalysts promote not only the formation of polyoxymethylene from trioxane, but also the degradation of polyoxymethylene into formaldehyde and other low molecular weight products. In the presence of substantial amounts of trioxane the rate of build-up of the polyoxymethylene molecules by polymerization exceeds the rate of degradation. In the absence of substantial amounts of trioxane, during and immediately after the removal thereof from the reaction mixture, the degradation rate exceeds the polymerization rate and net degradation results.

The solid, resinous polyoxymethylenes, to which this invention relates include those prepared from trioxane as the sole monomer and those prepared from trioxane and minor amounts (from about 0.1 to about 15 mole percent) of other monomers, such as cyclic ethers having at least two adjacent carbon atoms, preferably in the presence of a catalyst comprising a boron fluoride coordinate complex in which oxygen or sulfur is the donor atom.

In general, the cyclic ethers which may be used are of the formula

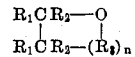

wherein each $R_1$ and $R_2$ is selected from the group consisting of hydrogen, lower alkyl and lower halogen substituted alkyl radicals and each $R_3$ is selected from the group consisting of methylene, oxymethylene, lower alkyl and haloalkyl substituted methylene and lower alkyl and haloalkyl substituted oxymethylene radicals and $n$ is an integer from zero to two.

The preferred cyclic ethers used in the preparation of the desired copolymers are ethylene oxide and 1,3-dioxolane which may be designated by the formula

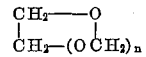

where $n$ is an integer from zero to two. Other cyclic ethers which may be used are 1,4-dioxane, trimethylene oxide, tetramethylene oxide, pentamethylene oxide, 1,2-propylene oxide, 1,2-butylene oxide, 1,3-butylene oxide and 2,2-di(chloromethyl) 1,3-propylene oxide.

The copolymers produced from the preferred cyclic ethers have a structure substantially composed of oxymethylene and oxyethylene groups in a ratio from about 6 to 1 to about 1000 to 1.

The copolymers produced are normally solid having melting points from somewhat lower than up to the melting point of the corresponding polyoxymethylene homopolymer, the preferred copolymers having melting points not less than 150° C. The copolymers have a weight loss when maintained in an open vessel at a temperature of 225±5° C. for 120 minutes not greater than 40 weight percent, as contrasted with the homopolymer which has a weight loss in excess of 80 weight percent.

The reaction conditions for the production of solid resinous polyoxymethylenes from trioxane are known in the art and do not comprise part of this invention. In general, the temperatures from about −10° C. to about 180° C. may be used, and the trioxane reactant may be polymerized in bulk, in solution or in suspension and may be in liquid, solid or vapor phase, although liquid phase polymerization is preferred.

The invention finds its greatest applicability when polymerization is carried out with a relatively nonvolatile catalyst (one which has a boiling point higher than the temperature at which unreacted trioxane is removed from the reaction mixture). However, adsorption effects on the surface of the polymer cause even volatile catalysts to remain in the reaction mixture in contact with the polyoxymethylene at temperatures above the normal boiling point of the catalysts.

The preferred relatively non-volatile catalyst, as stated above, are the acidic boron fluoride coordinate complexes such as boron fluoride coordinate complexes with organic compounds in which oxygen or sulfur is the donor atom and boron fluoride coordinate complexes with water.

The acidic coordinate complex with boron fluoride may, for example, be a complex with an alcohol, a phenol, an acid, an ether, an acid anhydride, an ester, a ketone, an aldehyde, a dialkyl sulfide or a mercaptan. Boron fluoride etherate, the coordinate complex of boron fluoride with diethyl ether is the preferred coordinate complex. The boron fluoride complexes with phenol and with acetic acid are also very effective. Other boron fluoride complexes which may be used are the complexes with ethanol, with methanol, with propanol, with butanol, with methyl acetate, with ethyl acetate, with phenyl acetate, with benzoic acid, with acetic anhydride, with acetone, with methyl ethyl ketone, with dimethyl ether, with methyl phenyl ether, with acetaldehyde, with chloral, with dimethyl sulfide and with ethyl mercaptan.

Other acidic catalysts which are relatively non-volatile include antimony trifluoride, antimony fluoborate, bismuth trifluoride, bismuth oxyfluoride, nickelous fluoride, aluminum trifluoride, titanium tetrafluoride, maganous fluoride, manganic fluoride, mercuric fluoride, silver fluoride, zinc fluoride, stannic chloride, titanium tetrachloride, zirconium tetrachloride, ethane sulfonic acid, fluosulfonic acid, thionyl chloride and phosphorous trichloride.

The preferred volatile acidic catalyst is boron fluoride. Other volatile acidic catalysts include hydrogen fluoride, ammonium bifluoride and phosphorus pentafluoride.

The catalysts are used in polymerization in proportions ranging from about 0.001% to about 1.0% by weight based on the trioxane starting material.

The polymerization reaction is preferably permitted to proceed to the point where not less than 10 percent by weight of trioxane remains, based upon the combined weight of trioxane and polyoxymethylene. The reaction product may be removed from the reaction vessel for treatment or may be treated in the reaction vessel for neutralization of the catalytic activity and removal of unreacted trioxane.

One of the preferred methods whereby the acidic catalyst is neutralized and the unreacted trioxane thereafter removed comprises subjecting the reaction mixture to a wash with an aqueous wash liquid. The initial contact of the reaction mixture with an aqueous wash liquid immediately neutralizes or deactivates the catalyst and renders it ineffective for both the polymerization and degradation reactions. Removal of the aqueous wash liquid from the solid, resinous polyoxymethylene carries with it the unreacted trioxane in aqueous solution.

The aqueous wash liquid may comprise water, itself, or it may comprise an aqueous solution of an inorganic salt, preferably a basic salt, such as sodium carbonate, or it may comprise a mixture of water and a water soluble organic solvent, such as a lower alcohol or ketone. The amount of aqueous wash liquid used is preferably relatively large since it must also remove the trioxane. However, to neutralize the acidic catalyst, the amount of wash liquid and the concentration of water therein need be no more than to provide about 10 moles of water per mole of acidic catalyst. The aqueous washing step may be carried out at any temperature at which the aqueous wash composition may be maintained in liquid phase, but preferably at a temperature from about 80° to about 100° C.

The treatment of the polymerization reaction product with an aqueous wash liquid is advantageous in its simplicity and low cost but is disadvantageous in that it recovers the unreacted trioxane in a condition which is not immediately suitable for further polymerization. Since the polymerization reaction must be carried out under anhydrous or substantially anhydrous conditions, it is necessary to remove substantially all of the water from the recovered trioxane solution before recycle.

Water may be separated from an aqueous trioxane solution by extracting the trioxane from its aqueous solution with a water insoluble organic solvent for trioxane such as benzene or methylene chloride. Where the trioxane polymerization process is carried out in conjunction with and in close proximity to a process for making trioxane from formaldehyde wherein a crude aqueous trioxane solution is obtained as a reaction product, it may be advantageous to recycle the trioxane wash solution to the crude trioxane solution and to recover anhydrous trioxane from the mixture in the same manner as the trioxane was originally recovered, such as by solvent extration with an organic solvent.

Where it is not convenient or desirable to recover trioxane from an aqueous solution it may be advantageous to remove unreacted trioxane from its polymerization reaction mixture by washing with an organic solvent, such as a hydrocarbon solvent. Since such solvents are not neutralization agents for the acidic catalyst, it is necessary, in accordance with this invention, to apply a catalyst neutralization reagent to the reaction mixture not later than the initiation of the trioxane extraction step. In other words, the neutralization agent may be applied prior to the solvent, or it may be applied together with the solvent by admixture therein. Where several stages of solvent extraction are used, the neutralization agent may be used in the first stage and omitted in later stages.

The preferred solvents are hydrocarbons, such as cyclohexane, benzene, hexane, heptane and octane and halogen substituted hydrocarbons, such as 1,2-dichloroethane and 1,1,2,2-tetrachloroethane. The amount of organic solvent used for trioxane removal depends on the amount of trioxane in the reaction mixture, the solvent capacity of the selected solvent under the trioxane removal conditions and upon the degree of purification desired. In general, between about ½ and about 2 volumes of solvent per volume of trioxane is used for each stage of solvent extraction. The organic solvent extraction step is preferably carried out at temperatures from about 65° C. to about 100° C.

The preferred catalyst neutralization agents are the aliphatic and heterocyclic amines. Among the amines which may be used are aliphatic primary amines such as n-butylamine aliphatic secondary amines such as di-n-butylamine and aliphatic tertiary amines such as tri-n-butylamine and heterocyclic amines such as pyridine.

The amount of basic catalyst neutralization agent used is preferably somewhat in excess of the amount necessary to neutralize the catalyst. Where a substantial excess of basic catalyst neutralization agent is used under such conditions that it is present in the recovered trioxane fraction, it should preferably be removed from the trioxane fraction before the trioxane is reused in polymerization. Otherwise, it will be necessary to use larger amounts of acidic catalyst in polymerization.

The basic catalyst neutralization agent is preferably applied to the polymerization reaction mixture in an organic liquid solution. When applied in a treatment prior to the solvent extraction of the trioxane from the reaction mixture, the neutralization agent is preferably applied in a small amount of the solvent to be used for trioxane removal.

This invention is also applicable to cases where unreacted trioxane is removed from the polymerization reaction mixture by means other than aqueous or organic solvents, such as cases where trioxane is volatilized off from the reaction mixture.

Where it is desired to remove unreacted trioxane from the polymerization reaction mixture by volatilization, it is necessary, in accordance with this invention to apply a catalyst neutralization agent to the reaction mixture not later than the initiation of the volatilization step. The catalyst may be neutralized or deactivated by a small amount of water or by a small amount of organic amine.

If desired, the polymerization reaction mixture may be subjected to a series of purification steps to remove the trioxane or to successively remove trioxane, catalyst neutralization product and other impurities from the desired polyoxymethylene. For example, it might be advantageous to remove the bulk of the unreacted trioxane from the reaction mixture by an organic solvent wash after catalyst neutralization and thereafter treat the mixture, for further purification with a water wash.

Example

Fifteen hundred grams of trioxane and 1500 grams of cyclohexane were heated at 75° C. to form a homogeneous solution. There was then added 0.33 ml. $BF_3$ dihydrate catalyst. Polymer began to precipitate in 7 minutes. After three hours heating and stirring at 75° C two portions of the polymer slurry were taken called portion A and portion B. Portion A was filtered and washed twice with hot cyclohexane at 75° by reslurrying and filtering the polymer. The resulting polymer was than given two water washes at 90-95° C. and dried overnight at 60°. Its inherent viscosity was 0.36 when measured in p-chlorophenol (containing 2% α-pinene) at 0.5% at 60° C. This polymer produced a very brittle disc on compression molding at 190° for 4 minutes.

Portion B (about 2500 g. of polymer slurry) was stirred one-half hour with 8.6 ml. tributyl amine at 75° C. The portion was filtered and washed twice with cyclohexane and then twice with 2000 ml. water at 90-95° C. for 15 minutes, after which it was dried overnight at 60° C. The inherent viscosity in p-chlorophenol (containing 2% α-pinene) at 0.5% concentration at 60° C. was 1.20. The polymer formed very tough discs on compression molding at 190° C. for 4 minutes.

It is to be noted that the increased stability of the polyoxymethylene of portion B was not based on the presence of tributylamine in the polymer when molded or when its viscosity was measured since tributylamine is soluble in cyclohexane and was substantially removed along with the trioxane by the two cyclohexane washes.

It is to be understood that the foregoing detailed description is merely given by way of illustration and that many variations may be made therein without departing from the spirit of our invention.

Having described our invention, what we desire to secure by Letters Patent is:

1. The method which comprises treating a polymerization product mixture of trioxane, solid, resinous polyoxymethylene and an acidic trioxane-polymerization catalyst with a catalyst deactivation agent to deactivate the catalyst therein and thereafter removing trioxane from said mixture.

2. The method of claim 1 wherein said acidic trioxane-polymerization catalyst comprises an acidic boron trifluoride coordinate complex.

3. The method which comprises treating a polymerization product mixture of trioxane, solid, resinous polyoxymethylene and an acidic trioxane-polymerization catalyst with a catalyst deactivation agent to deactivate the catalyst therein and thereafter extracting trioxane from said mixture with a solvent therefor.

4. The method which comprises treating a polymerization product mixture of trioxane, solid, resinous polyoxymethylene and an acidic trioxane-polymerization catalyst with an aqueous wash liquid to deactivate the catalyst therein and to extract the trioxane therefrom.

5. The method which comprises treating a polymerization product mixture of trioxane, solid, resinous polyoxymethylene and an acidic trioxane-polymerization catalyst with an amine, selected from the group consisting of aliphatic and heterocyclic amines, to deactivate the catalyst therein and thereafter extracting trioxane from said mixture with an organic solvent therefor.

6. In the production of solid, resinous polyoxymethylene by the polymerization of trioxane in contact with an acidic catalyst wherein a reaction mixture comprising polyoxymethylene, unreacted trioxane and acidic catalyst is produced and wherein unreacted trioxane is removed from said reaction mixture, the improvement which comprises deactivating said acidic catalyst not later than the initiation of said removal step.

7. In the production of solid, resinous polyoxymethylene by the polymerization of trioxane in contact with an acidic catalyst comprising an acidic coordinate complex of boron trifluoride wherein a reaction mixture comprising polyoxymethylene, unreacted trioxane and acidic catalyst is produced and wherein unreacted trioxane is removed from said reaction mixture, the improvement which comprises deactivating said acidic catalyst not later than the initiation of said removal step.

8. In the production of solid, resinous polyoxymethylene by the polymerization of trioxane in contact with an acidic catalyst wherein a reaction mixture comprising polyoxymethylene, unreacted trioxane and acidic catalyst is produced and wherein unreacted trioxane is removed from said reaction mixture, the improvement which comprises simultaneously deactivating said acidic catalyst and extracting trioxane from said reaction mixture by the application thereto of an aqueous wash liquid.

9. In the production of solid, resinous polyoxymethylene by the polymerization of trioxane in contact with an acidic catalyst comprising an acidic coordinate complex of boron trifluoride wherein a reaction mixture comprising polyoxymethylene, unreacted trioxane and acidic catalyst is produced and wherein unreacted trioxane is extracted from said reaction mixture with an organic solvent therefor, the improvement which comprises deactivating said acidic catalyst not later than the initiation of said extraction step.

10. In the production of solid, resinous polyoxymethylene by the polymerization of trioxane in contact with an acidic catalyst comprising an acidic coordinate complex of boron trifluoride wherein a reaction mixture comprising polyoxymethylene, unreacted trioxane and acidic catalyst is produced and wherein unreacted trioxane is removed from said reaction mixture, the improvement which comprises deactivating said acidic catalyst prior to the initiation of said removal step.

11. In the production of solid, resinous polyoxymethylene by the polymerization of trioxane in contact with an acidic catalyst wherein a reaction mixture comprising solid, resinous polyoxymethylene, unreacted trioxane and acidic catalyst is produced and wherein unreacted trioxane is removed from said reaction mixture and again subjected to polymerization conditions, the improvement which comprises deactivating said acidic catalyst in said reaction mixture not later than the initiation of said removal step.

12. The method which comprises polymerizing trioxane in contact with an acidic catalyst in a polymerization step, recovering as a product of said polymerization step a reaction mixture comprising trioxane, solid, resinous polyoxymethylene and acidic catalyst, deactivating said acidic catalyst in said reaction mixture and thereafter extracting trioxane from said reaction mixture with a solvent therefor and resubjecting said extracted trioxane to polymerization conditions.

13. The method of claim 12 wherein said acidic catalyst is deactivated with an aliphatic amine and wherein said solvent is an organic solvent.

14. The method which comprises polymerizing formaldehyde to produce a crude aqueous product containing trioxane in solution, recovering trioxane from said crude aqueous product and polymerizing said trioxane in contact with an acidic catalyst to produce a mixture comprising solid, resinous polyoxymethylene unreacted trioxane and acidic catalyst, simultaneously deactivating said acidic catalyst and extracting trioxane from said reaction mixture by the application thereto of an aqueous wash liquid, thereby producing an aqueous trioxane extract and recycling said aqueous trioxane extract to said crude aqueous product for the recovery of trioxane therefrom.

References Cited in the file of this patent

UNITED STATES PATENTS

| | | |
|---|---|---|
| 2,270,135 | Mikeska et al. | Jan. 13, 1942 |
| 2,768,994 | MacDonald | Oct. 30, 1956 |
| 2,795,571 | Schneider | June 11, 1957 |

FOREIGN PATENTS

| | | |
|---|---|---|
| 748,856 | Great Britain | May 9, 1956 |